Figure 1:
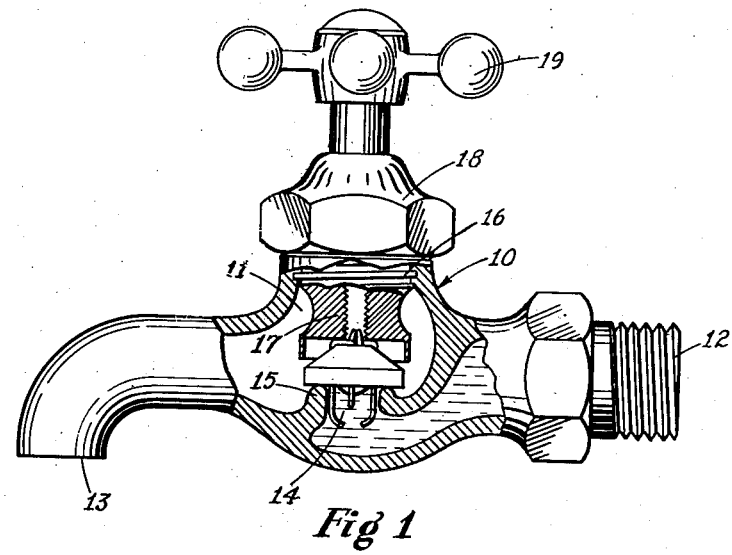

June 27, 1944.　　　　A. L. AREY　　　　2,352,307

FAUCET WASHER

Filed April 9, 1942

INVENTOR
ALTON L. AREY.
BY
ATTORNEY

Patented June 27, 1944

2,352,307

UNITED STATES PATENT OFFICE 2,352,307

FAUCET WASHER

Alton L. Arey, East Cleveland, Ohio

Application April 9, 1942, Serial No. 438,240

3 Claims. (Cl. 277—30)

This invention relates to water faucets and more particularly to a new and improved floating type washer construction for use therewith.

It is among the objects of the present invention to provide a washer for use in the ordinary water faucet which is maintained in operative position with respect to the inlet port of the faucet, independently of and free of any connecting means with the valve stem of the faucet.

A further object of the invention is to provide a faucet washer of the foregoing type embodying means for automatically admitting air into the supply pipe after the flow of water has been cut off, to effect a draining of the pipe without actuating the valve stem of the faucet, thereby eliminating the danger of freezing and consequent damage to the water pipes.

Another object of the invention is to provide a faucet washer wherein the means for admitting air into the supply pipe is automatically maintained closed by the pressure of the water in the water line.

A still further object of the invention is to provide a valve washer embodying members cooperating with the inlet port of the valve for maintaining the washer operatively positioned with respect to the valve seat and the adjacent end of the valve stem.

Another object of the invention is to provide a faucet construction embodying a valve washer and valve stem which are relatively movable, thereby preventing excessive wear on the washer upon being brought into engagement with the valve seat.

A still further object of the invention is to provide a new and improved replacement washer which is relatively simple in construction, economical to manufacture, and easily applied without resort to screws, bolts, clips and the like.

Figure 2:
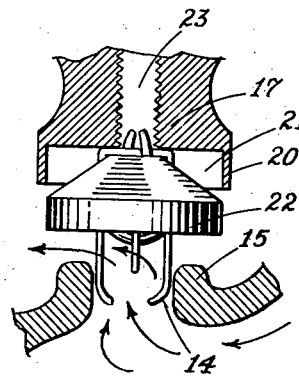
Figure 3:
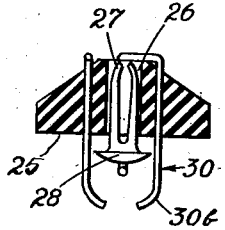
Figure 4:
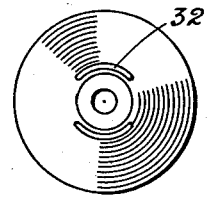
Figure 5:
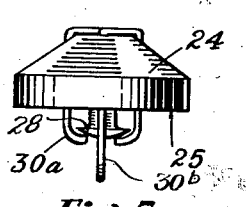
Figure 6:
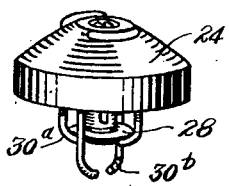

The foregoing objects of the invention will become more apparent and better understood from the following detailed description taken in conjunction with the accompanying drawing, wherein similar reference characters denote corresponding parts, and wherein:

Figure 1 is a side elevational view of a faucet construction with parts thereof broken away and in section illustrating the valve and washer arrangement of the present invention, Figure 2 is an enlarged fragmentary sectional detail illustrating the relation between the washer and the valve seat surrounding the inlet port when the valve is open and fluid is passing therethrough, Figure 3 is a medial sectional view through the washer, and Figures 4, 5 and 6 are top plan view, side elevational view, and perspective view, respectively, of a washer embodying the present invention.

With reference to Figure 1 of the accompanying drawing the invention is illustrated in connection with a water faucet broadly indicated by the numeral 10, including a valve chamber 11, having an inlet 12 for threaded connection with a source of water supply and an outlet 13. The valve chamber 11 is provided with an inlet port 14, surrounding which there is formed a raised valve seat 15. Mounted within the valve chamber 11 for rotatable and endwise movement on screw threads 16 is a valve stem 17, the shank of which extends upwardly through a cap 18 and has mounted thereon a hand wheel 19. As shown more clearly in Figure 2, the lower end of the valve stem is provided with a depending peripherial flange 20, defining a recess 21 which serves to fit over the upper end of a washer 22 disposed upon the valve seat 15. Extending inwardly from the end of the valve stem 17 is an axial bore 23.

The washer 22 is formed with a frustro-conical body portion 24, having a substantially flat bearing surface 25 which is adapted to engage the valve seat 15. The body portion of the washer is provided with an axial bore 26 which receives a split pin 27, the head 28 of which is of greater diameter than the bore 26 and serves to seal the lower end of the bore 26 when the supply line has water pressure therein. Projecting below the bearing surface 25 of the washer 22 is a cage 30 formed of a plurality of depending wire-like members 30ᵃ and 30ᵇ depending at different lengths below the surface 25. The shorter members 30ᵃ have the ends inturned and define the extent of downward movement of the head of the split pin 27, whereas the longer members 30ᵇ serve as guides for maintaining the washer 22 in proper relation with respect to the valve seat 15. As shown in Figure 2, the engagement of the cage 30 within the inlet port 14 and the extension of the ends of the split pin 27 into the axial bore 23 of the valve stem 17 aligns and maintains the washer in proper operative position during the opening and closing of the faucet. The members 30ᵃ and 30ᵇ extend through the washer 24 and have their upper ends connected as at 32 to form a metallic bearing surface on the upper surface of the washer which is engaged by the lower end surface of the valve stem 17 when the faucet is being closed.

In the ordinary use of the faucet, the passageway through the washer is maintained closed by the pressure of the water against the head 28 of the pin 27. When the faucet is opened by rotating the valve stem, the washer is caused to move off the seat 15 also by the water pressure, however the ends of the depending members 30$^b$ remain within the inlet port 14 to guide the washer into proper position upon closing of the faucet. When the faucet is being closed, the valve stem moves the washer into contact with the valve seat and since there is no connecting means between the washer and valve stem, further rotation of the stem to clamp the washer on the seat does not cause any wear upon the operative surface of the washer. To replace the washer it is only required to lift out the washer and drop a new one in its place.

It is to be understood that the invention herein shown and described is presented for purposes of illustration and explanation and that various modifications thereof may be made within the scope of the appended claims without departing from the spirit of the invention.

I claim:

1. A resilient washer for a faucet having a vertically extending inlet port with a washer receiving seat formed thereabout, comprising a frusto-conical body portion with a valve seat engaging surface formed on the lower surface thereof and having an axial opening extending therethrough, a valve member disposed within said opening, wire means depending from the lower surface of the washer for limiting the movement of the valve member with respect to the said opening through the body portion, said wire means adapted to be received within the inlet port of a faucet and serving to guide the washer in its movement with respect to the seat surrounding said inlet port.

2. A resilient washer for a faucet having a vertically extending inlet port with a washer receiving seat formed thereabout comprising a frusto-conical body portion with a valve seat engaging surface formed on the lower surface thereof and having an axial opening therethrough, a valve member mounted in said opening responsive to fluid pressure within the faucet to open or close said opening, and wire means depending from the lower surface of the washer and adapted to be received within the inlet port of the faucet for guiding the washer in its movement with respect to the seat surrounding said inlet port.

3. In a faucet including a valve stem and a valve seat surrounding the inlet port thereof, a resilient washer movable between said stem and seat within the faucet independent of any securing means, valve means in said washer responsive to water pressure in the inlet port, and wire means depending from the seat engaging surface of the washer slidably engageable within the inlet port and serving to define the movement of the washer as the valve stem is moved from open to closed position.

ALTON L. AREY.